Figures 1, 2:
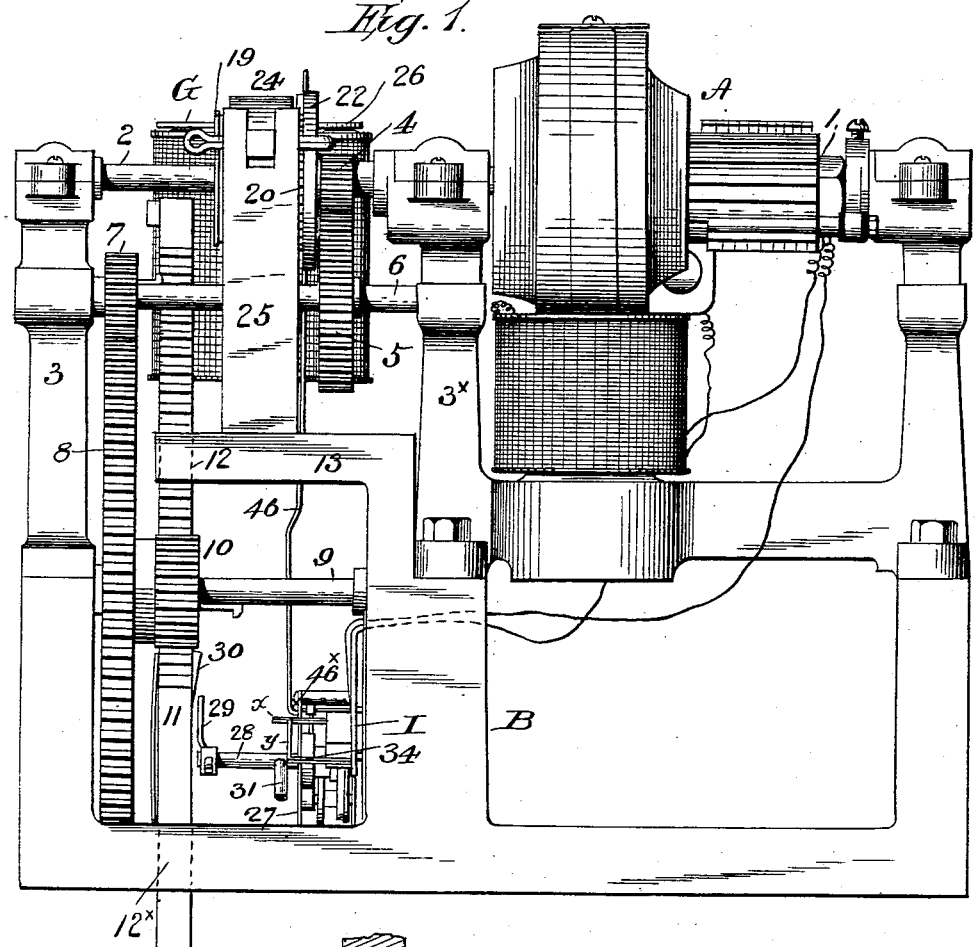

(No Model.) 4 Sheets—Sheet 1.

W. DAVES.
ELECTRIC RAILWAY SIGNAL.

No. 564,683. Patented July 28, 1896.

Witnesses:
F. L. Ourand
A. G. Heyman

Inventor:
William Daves
By J. M. Yznaga.
Attorney.

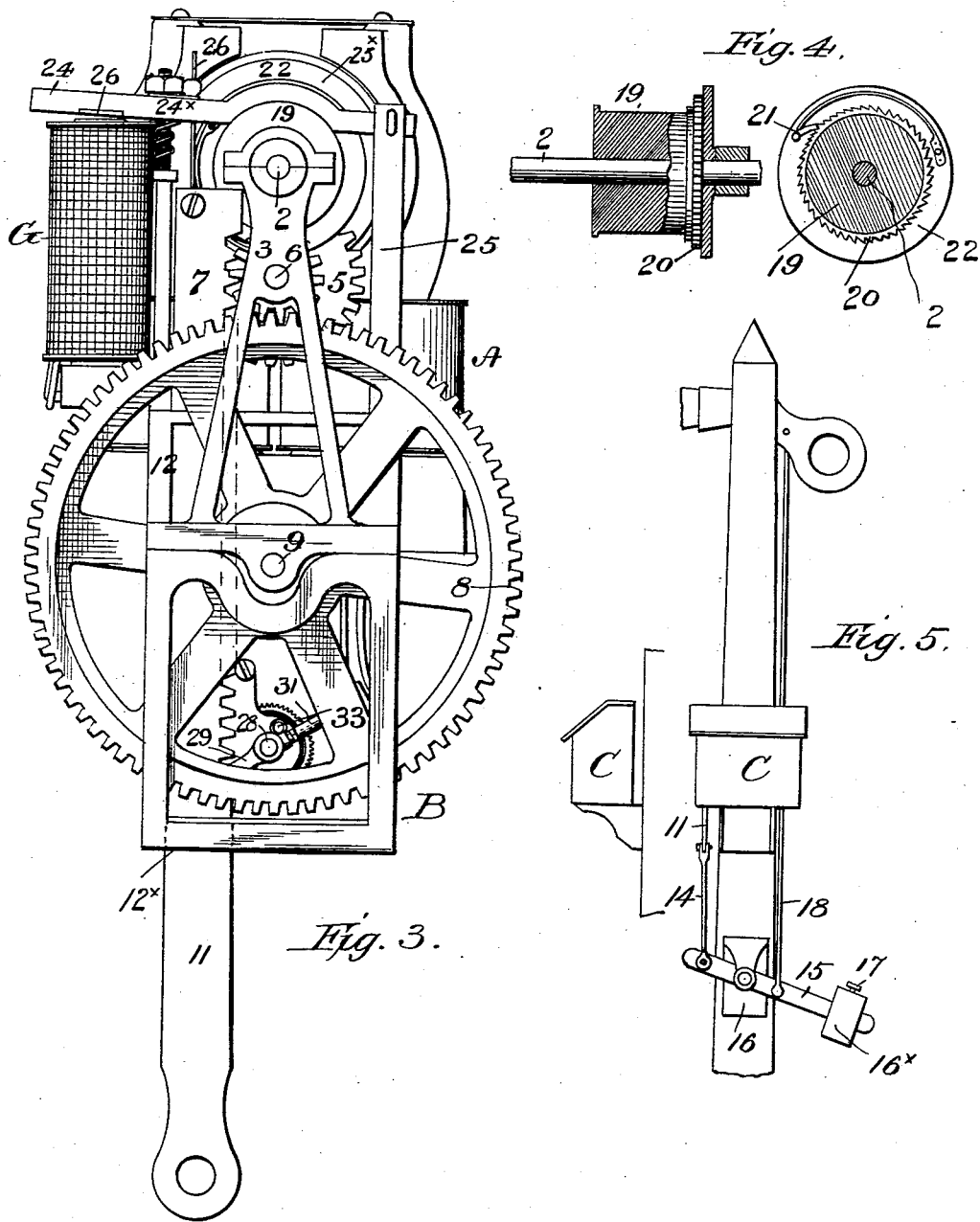

(No Model.)   4 Sheets—Sheet 3.
W. DAVES.
ELECTRIC RAILWAY SIGNAL.
No. 564,683.   Patented July 28, 1896.
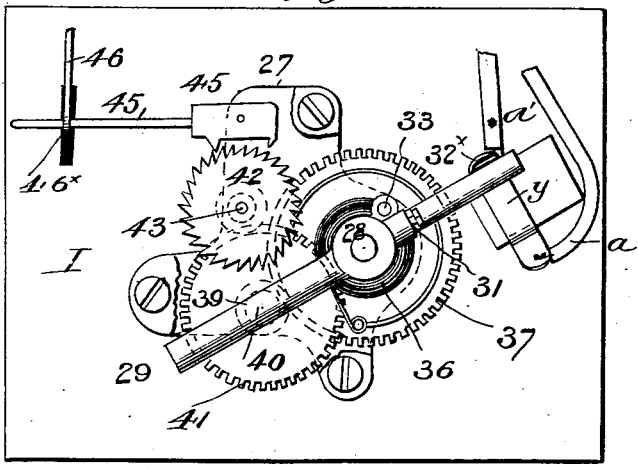
Fig. 6.
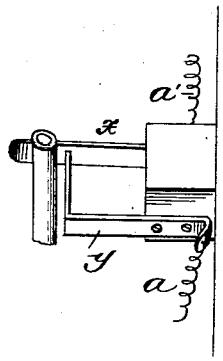
Fig. 7.
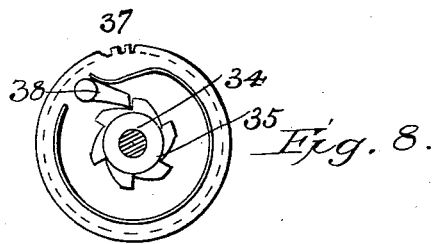
Fig. 8.
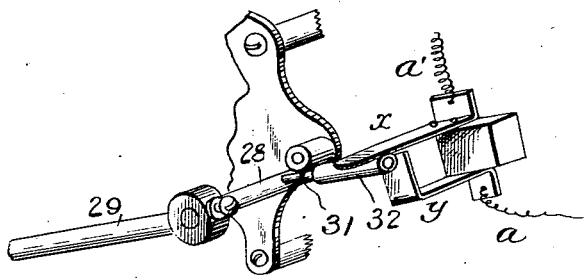
Fig. 7ᵃ.
Witnesses:
F. L. Ourand
A. G. Heyhuun
Inventor:
William Daves
by J. M. Yznaga.
Attorney.
THE NORRIS PETERS CO., PHOTO-LITHO., WASHINGTON, D. C.

(No Model.)   4 Sheets—Sheet 4.

W. DAVES.
ELECTRIC RAILWAY SIGNAL.

No. 564,683. Patented July 28, 1896.

Witnesses
F. L. Ourand
A. G. Heylman

Inventor
William Daves,
by J. M. Yznaga.
Attorney

UNITED STATES PATENT OFFICE.

WILLIAM DAVES, OF JERSEY CITY, NEW JERSEY, ASSIGNOR OF TWO-THIRDS TO WILLIAM H. PEDDLE, OF ROSELLE, AND JACOB H. OLHAUSEN, OF ELIZABETH, NEW JERSEY.

ELECTRIC RAILWAY-SIGNAL.

SPECIFICATION forming part of Letters Patent No. 564,683, dated July 28, 1896.

Application filed April 22, 1896. Serial No. 588,639. (No model.)

*To all whom it may concern:*

Be it known that I, WILLIAM DAVES, a citizen of the United States, residing at Jersey City, in the county of Hudson and State of New Jersey, have invented certain new and useful Improvements in Electric Railway-Signals; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in electrically-controlled railway-signals; and the object is to provide an automatically-operating mechanism for controlling the electric circuit of an electric railway-signal, the mechanical action being controlled by an electric grip and the electric circuit by an automatically-operating time-circuit mechanism.

The invention is particularly designed for use in connection with a railway-track circuit, a track-battery therein, a relay in the track-circuit, a motor and a motor-battery, a battery and circuit for operating the electric grip, an automatic controlling mechanism in the signal-circuit and railway-signal.

I am aware that heretofore there have been made circuit-controlling devices to break the signal-circuit when the signal is moved from the "danger" position to that of "safety" by the operation of a motor and the associated mechanism of the signal; but because the signal-blade does not at all times drop or move to the same angle or position when it is lowered to the "safety" position, more especially in cold and stormy weather, the circuit-controlling devices used in such apparatuses fail to open the circuit and thus leave the motor-battery circuit closed and active, and the battery, by reason of this closed condition of the circuit, to become uselessly exhausted. It is with a view of remedying and overcoming this defect and trouble that I have invented the automatic time-circuit-controlling mechanism, whereby the motor-circuit will be opened or closed after a certain length of time, no matter at what angle the signal-blade stops in being moved from the "danger" position to that of "safety," or from "safety" to "danger," thus preventing the signal or motor battery from becoming needlessly exhausted.

I accomplish the objects of my invention by the means and appliances illustrated in the accompanying drawings, forming a part of this specification, and wherein—

Figure 9:
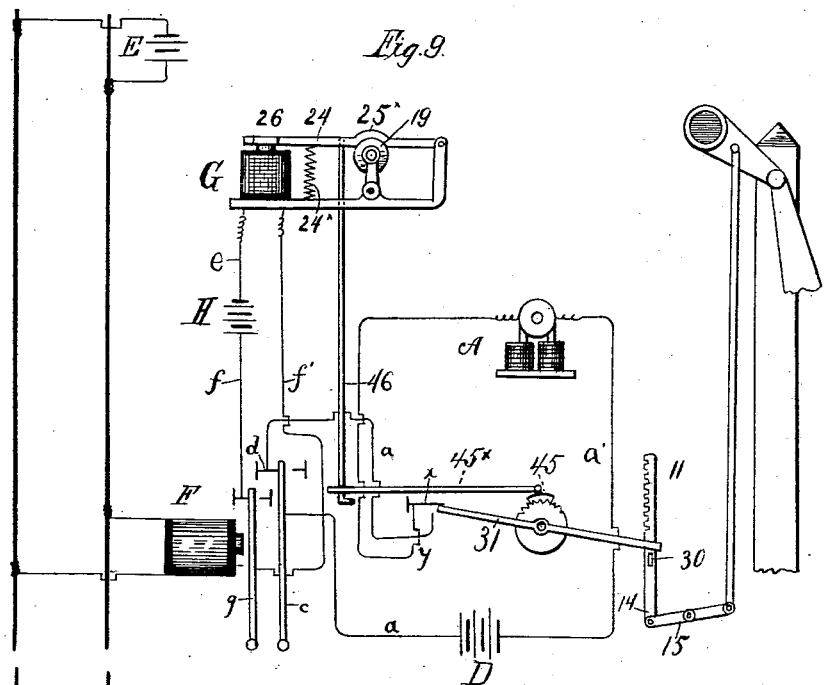
Figure 10:
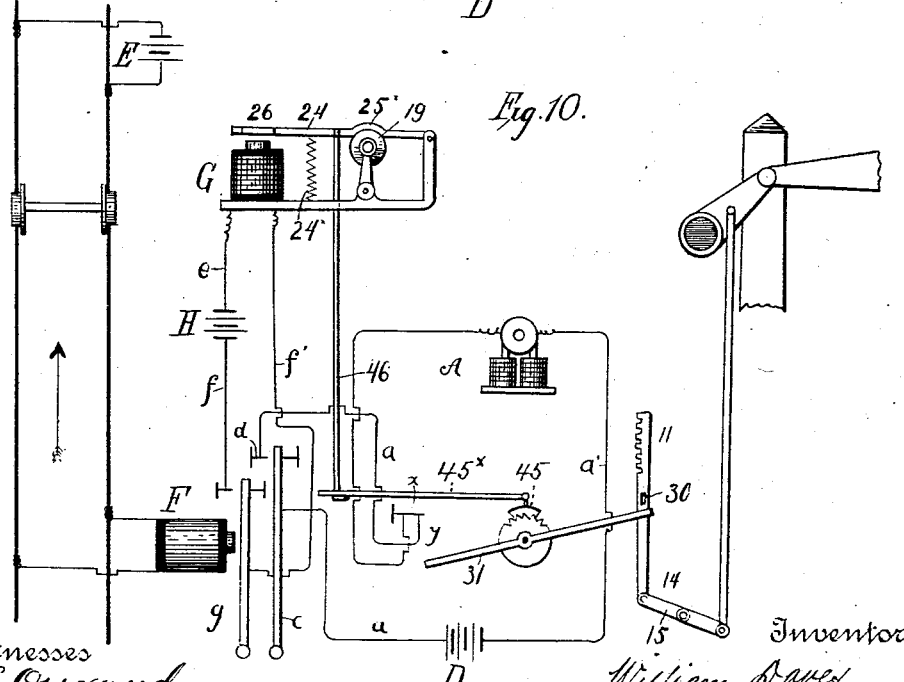

Figure 1 is a side view in elevation of the motor and the associated signal mechanism. Fig. 2 is a detail view of a portion of the signal rack-bar, partly in section, showing the spring-catch for returning the lever which breaks the motor-circuit to normal position. Fig. 3 is an end elevation showing the mechanism for operating the signal rack-bar, the electromagnet for controlling the grip-armature, and the drum with which said armature engages. Fig. 4 is a detail central longitudinal vertical section through the loosely-mounted drum and the disk with which it locks, and a transverse section showing the pawl-and-rachet engagement between the drum and the disk fixed on the extension of the armature-shaft of the motor. Fig. 5 is a detail of the apparatus mounted on the signal-pole. Fig. 6 is a side view of the automatic time mechanism for opening and closing the motor-circuit and the pivoted latch for locking the mechanism in position. Fig. 7 is a detail view of the spring-contact interposed in the motor-circuit, showing the lever in the position of separating the contact to break the circuit. Fig. 7ª is a detail perspective of the motor-circuit contacts and lever for opening them. Fig. 8 is a detail of the time-setting ratchet and retaining-pawl. Fig. 9 is a diagrammatic view showing the arrangement of the respective circuits and the relative aggroupment of the associated mechanism when the signal is at the "safety" position. Fig. 10 is a diagrammatic view showing the arrangement and condition of the respective circuits and the relative aggroupment of the associated mechanism when the signal is at the "danger" position and a train is present on the insulated section or block of railway.

Reference being had to the drawings, A designates the motor, which may be of any of the approved types of construction adapted to the purpose of actuating the signal mechanism. The frame of the motor is mounted upon and suitably secured to a substantial rectangular frame B. The armature-shaft 1 of the motor is extended, as at 2, the end portion of the extension of the shaft being journaled in a standard 3, rising from the frame B, substantially as shown. On the shaft 2 is fixed a pinion 4, meshing with a larger gear-wheel 5, fixed on a shaft 6, journaled in suitable bearings in the standards 3 $3^\times$ and carrying a pinion 7 fixed thereon, which meshes with a large gear-wheel 8, mounted on a shaft 9, journaled in the frame B, and carrying a small pinion 10, which meshes with a vertically-arranged reciprocating rack-bar 11. The rack-bar 11 slides through guideways or slots 12 $12^\times$, formed in the floor of the frame B and in the overhanging plate 13, respectively, and is limited in its movements up and down by any suitable stops. The lower end of the rack-bar is connected to the upper end of a link or bar 14, having its lower end pivotally connected to a weighted lever 15, fulcrumed on a bracket 16, secured to the signal-pole, the said lever being provided with a weight $16^\times$, adjustably arranged thereon, and which may be fixed in the desired position by means of a set-screw 17, as indicated in Fig. 5 of the drawings. At a suitable point in the lever 15 is pivotally secured one end of a rod 18, the other end of the rod being pivotally connected to the rear arm of the signal.

The frame, with the motor and the associated mechanism, is mounted and concealed for protection in a box C, secured to the signal-pole, as shown. The motor-battery D has suitable connection to the motor by the conductors or wires $a$ $a'$, the circuit having severable contact by the spring-contacts $x$ $y$, and also closed and opened at the relay by contact-pieces $c$ $d$, the spring-contacts being opened by the agency of the automatic time-circuit-controlling mechanism (hereinafter described) and closed by the release or reverse movement of the lever thereof, and the relay-contacts being controlled by the action of the track-circuit.

The track-circuit is formed by a suitable track-battery E, thence to the rails by the usual connections, through the rails to the relay F, as indicated in Figs. 9 and 10 of the drawings, the relative effect of the track-circuit on the motor-circuit being that when the former is in force and active the latter will be closed at the relay-contact, but so that when the track-circuit is interrupted and the relay cut out by the presence of a train on the block or track the contact elements of the relay will be released, that is to say, it will break the wire connections between the motor and the battery at the same time the relay is released. The same action or interruption also breaks the circuit of the electric grip, allowing the motor to release the signal and the signal to go to "danger."

The signal-blade casting and the weight $16^\times$ are arranged so that when the electric grip is released the signal will automatically reverse the motor and the signal will go to "danger," and at the same time the time-circuit-controlling device will move the lever from the contacts, thus closing the motor-circuit at the time-circuit contacts, but the motor-circuit will be opened through the point of the relay. Thus it will be perceived that it requires no battery to move the signal from a "safety" position to one of "danger," the signal being moved from a "safety" position to a "danger" position automatically by the balance-lever weight $16^\times$.

Suitably mounted on the frame B is an electromagnet G, vertically arranged, as shown in Fig. 3 of the drawings, being interposed in the circuit of a battery H, the circuit being by wire $e$ on one side and by wires $ff'$ through relay contact-piece $g$, as shown in Figs. 9 and 10 of the drawings. On the extension 2 of the armature-shaft 1 is loosely mounted a drum 19, formed or provided with a row of ratchet-teeth 20 on one flange, which are engaged by a spring-actuated pawl 21, pivotally supported on a disk 22, fast on the shaft 2. On a support rising from the frame B, as 25, is pivotally supported a lever 24, formed with a curve or shoe $25^\times$, conforming to the contour of the drum 19 and carrying on its free end the armature 26 of the electromagnet G, so that when the armature is drawn down on the poles of the magnet the drum will be held against rotation and the mechanism locked when the signal is at "safety" until the drum is released. The grip-lever 24 is raised, when the circuit is broken, by means of a spring $24^\times$, suitably disposed to effect the purpose.

I designates the automatic time-circuit mechanism, interposed in the motor-circuit and controlled in its action by connection to the grip-lever 24, carrying the armature 26, operated by the electromagnet G. This automatic time-circuit mechanism will now be described. A suitable frame 27 is secured to the frame B, and in the frame 27 is journaled a shaft 28, projecting from the frame and carrying a lever or arm 29, arranged in the path of the spring-catch 30, arranged in the rack-bar, substantially as indicated in Fig. 2 of the drawings.

On the shaft 28 is secured an arm 31, projecting therefrom in the opposite direction to that of the lever 29, and the arm 31 being made of a suitable non-conducting material or inclosed by an insulating-covering 32. This arm 31 moves in the path of one of the contact-springs $x$ or $y$, in this instance the spring $x$, so that when the arm is turned to lodge against the spring it will break the contact and open the motor-circuit. An insulated stop 33 is provided, which stays and stops the force of the arm from spreading the springs farther than may be necessary to effect the desired purpose. On the shaft 28 is fixed a sleeve 34, formed with a ratchet-wheel 35, and to the shaft is fixed one end of a coiled spring 36, the other end of the spring being fixed to the frame, so that when the shaft, with the arms, is turned, with the insulated arm away from the contact-spring and then released, the spring will rotate the shaft in the reverse direction and carry the arm into contact with the contact-spring and break the motor-circuit.

On the shaft 28 is loosely mounted a gear-wheel 37, on which is arranged a spring-actuated pawl 38, which engages the ratchets of the wheel 35 to hold the gear and ratchet-wheel locked together to turn with the shaft in the return movement thereof. The gear-wheel 37 meshes with a pinion 39 on a shaft 40, journaled in the frame and carrying a larger gear-wheel 41, which meshes with a pinion 42 on a shaft 43, carrying an escapement-wheel 44, which is engaged by an escapement 45, formed with an arm $45^\times$, which has loose connection with a rod 46, formed with a lateral extension $46^\times$, on which the arm $45^\times$ rests, the upper end of the rod being adjustably connected to the grip-lever 24, so that when the grip-lever stands raised and free from the drum, and the armature consequently away from the poles of the electromagnet, (the position assumed when the signal is at "danger,") the escapement will be locked in the escapement-wheel and the train of gearing held against rotation. It will be perceived also that when the escapement is released by the descent of the armature the spring of the time-circuit-controlling mechanism is free to exert its force to actuate that mechanism and lift the insulated arm to break the motor-circuit.

In the general operation of the system when F is deënergized the signal is at "danger," and the time mechanism is locked by the escapement against the tension of the actuating-spring 36, as indicated in Fig. 10, the motor-circuit being open to the relay-contact $d$. When the train passes off the section, the magnet F is energized, which closes the local circuit through H G, thereby attracting the armature 24 and thus applying the grip-lever and releasing the escapement of the automatic time-circuit-controlling mechanism. This will allow the spring of that mechanism to rotate the shaft with which it is connected, thus moving the insulated arm into contact with the circuit-closing contact-spring, opening the springs and breaking the motor-circuit after the motor has lowered the semaphore to "safety." At the time the motor and the grip-circuits are closed the motor will be put in operation, and the signal-blade will commence to move from the "danger" position to that of "safety." This movement usually takes about three seconds. Now because the automatic time-circuit-controlling mechanism, which is put in operation at the same time as the motor and blade, takes from four to five seconds to do its work of breaking the motor-circuit, it is apparent that if the signal-blade should from any cause fail to reach the full limit of its "safety" position, which under former devices would retain the motor-circuit closed when it should be opened, the automatic time-circuit mechanism would at the end of time to which set do its work and break the circuit and thus prevent the motor-battery from becoming further exhausted.

The motor and the connected mechanism operate the signal from "danger" to "safety," and at the same time the grip-lever will be brought down on the drum through the agency of the energized magnet G, and the drum thus be locked against turning. Now let it be assumed that the signal is resting at the "safety" position. A train enters the insulated section of track and short-circuits the relay and opens the grip-circuit. This deënergizes the magnet H and releases the grip-lever from the drum and permits the blade to move to "danger." The action pushes up the rack-rod, the spring-catch of which carries the lever-arm 29 upward and sets the time-circuit mechanism, and at the same time permits the contacts $x$ and $y$ to close and complete the motor-circuit, and the time-circuit mechanism being locked by the escapement. Now the signal is at "danger" with the train on the block with the springs $x$ and $y$ closed, but the grip-circuit and the motor-circuit both broken at the relay, and the time mechanism set for action. When the train has passed from the block, the track-battery becomes again active and restores the force of the relay in energy, the grip-circuit and the motor-circuit thus restored through the relay, the motor operates to move the signal to "safety," and the time-mechanism brought into operation to break the motor-circuit, as heretofore specified.

Having thus described my invention, what I claim, and desire to secure by Letters Patent, is—

1. In an electrically-controlled railway-signal, a track-circuit, a relay in the track-circuit arranged to be cut out by the presence of a train on the rails within the said circuit, a motor, a motor-circuit closed and opened at the relay and having contacts interposed therein, an automatic time-circuit mechanism to break the interposed contacts, and an electrically-controlled connection to lock and release the time-circuit mechanism.

2. In an electrically-controlled railway-signal, a track-circuit, a relay in the track-circuit arranged to be cut out of circuit by the presence of a train on the rails within the circuit, a motor, a motor-circuit closed and opened at the relay, a separable point in the motor-circuit, an automatic time-circuit mechanism to break the separable point in the motor-circuit and arranged to be set by the movement of the signal-lever, and an electric circuit to lock and release the time mechanism.

3. In an electrically-controlled railway-signal, the combination of a track-circuit, a relay in the said circuit, a motor, a motor-circuit normally opened and closed by the relay, and having separable contacts in the motor-circuit, an automatic time-circuit-controlling mechanism to break the motor-circuit, a signal-lever actuated by the motor, a latch in the said lever to engage and set the time-circuit mechanism, and an electric magnet to lock and release the time-circuit mechanism.

4. In an electric railway-signal the combination with a track-circuit, a relay therein, a motor-circuit normally opened by the relay, and a circuit having an electromagnet therein, of a signal mechanism operated by the motor, and an automatic time-circuit mechanism in the motor-circuit arranged to be locked and released by the electromagnet and to be set for action by the signal mechanism.

5. In an electric railway-signal, a motor, a signal, mechanism actuated by the motor to operate the signal, an electromagnet, a circuit containing the magnet, a motor-circuit, a track-circuit, and an automatic time-circuit mechanism to break the motor-circuit, comprising a spring-actuated lever arranged to break the motor-circuit, and a connection to the electromagnet to lock and release the lever.

6. The combination of an electric signal, a motor and circuit therefor, the mechanism moved by the motor, a section of insulated railway-track, a track-battery, a track-relay to operate the signal, an electric grip to control the mechanical action of the motor, an electric circuit to control the action of the said grip, and an automatic time-circuit-controlling mechanism to control the signal-circuit.

In testimony whereof I affix my signature in presence of two witnesses.

WILLIAM DAVES.

Witnessess:
H. P. MASON,
G. A. RAWLINS.